United States Patent [19]

Bovio et al.

[11] 4,332,487

[45] * Jun. 1, 1982

[54] SOLID INK CARTRIDGE FOR A NON-IMPACT PRINTER

[75] Inventors: Michele Bovio, Brosso; Aquilino Barbero, Pavone; Walter Gillone, Ivrea; Pierangelo Berruti, Chivasso, all of Italy

[73] Assignee: Ing. C. Olivetti & C., S.p.A., Ivrea, Italy

[ * ] Notice: The portion of the term of this patent subsequent to Dec. 9, 1997, has been disclaimed.

[21] Appl. No.: 173,823

[22] Filed: Jul. 30, 1980

Related U.S. Application Data

[63] Continuation of Ser. No. 972,267, Dec. 22, 1978, Pat. No. 4,238,807.

[30] Foreign Application Priority Data

Dec. 28, 1977 [IT] Italy .............................. 69927 A/77

[51] Int. Cl.$^3$ ............................................ G01D 15/18

[52] U.S. Cl. ................................ 400/126; 346/140 R

[58] Field of Search .................... 400/126; 346/140 R, 346/140 A, 140 PD, 150, 76 R; 401/1-2, 49, 55, 68, 69, 81

[56] References Cited

U.S. PATENT DOCUMENTS

| | | | |
|---|---|---|---|
| 2,173,741 | 9/1939 | Wise et al. | 346/140 X |
| 2,272,780 | 2/1942 | Schweyer | 401/2 |
| 2,494,412 | 1/1950 | Simkins | 401/2 |
| 2,582,043 | 1/1952 | Krahulec | 346/140 A |
| 3,893,131 | 7/1975 | Perel et al. | 346/140 PD |
| 3,969,606 | 7/1976 | Veach | 401/1 |
| 4,150,623 | 4/1979 | Hamilton | 401/1 |
| 4,218,152 | 8/1980 | Sloan | 401/2 |
| 4,238,807 | 12/1980 | Bovio | 346/140 PD |

FOREIGN PATENT DOCUMENTS

| | | | |
|---|---|---|---|
| 663516 | 8/1929 | France | 401/81 |

*Primary Examiner*—E. H. Eickholt
*Attorney, Agent, or Firm*—W. R. Hulbert

[57] ABSTRACT

A solid ink cartridge for a non-impact printer with emission of solid ink particles is disclosed. A rod of solid ink is spring-pressed in an insulating housing against an end wall with a nozzle therein. A pulsed high voltage applied between the ink rod and a counter-electrode (which can be behind a paper target) causes ink particles to be eroded from the rod and ejected through the nozzle onto the paper. The printer includes incremental line-feed paper movement, movement of printing devices as just described along the printing line, and selective control of the high-voltage pulsing such as to form characters by a dot matrix technique.

23 Claims, 9 Drawing Figures

SOLID INK CARTRIDGE FOR A NON-IMPACT PRINTER

This application is a continuation of application Ser. No. 972,267, filed Dec. 22, 1978, entitled, Non-Impact Printing Device, now U.S. Pat. No. 4,238,807 and claims priority on Italian Patent Application No. 69927-A/77, filed Dec. 28, 1977, a certified copy of which is on file with the above identified parent application.

BACKGROUND OF THE INVENTION

This invention relates to a solid ink cartridge for use in a non impact printer for recording graphic symbols on ordinary paper by means of selective emission of ink particles by an ejector.

Methods and devices are known wherein drops of liquid ink are emitted selectively through a nozzle by an ejector device actuated through the medium of a piezoelectric crystal and wherein each electrical stress applied to the crystal produces a corresponding compression of the volume of the chamber containing the ink and a corresponding emission of drops through the nozzle.

It is also known to produce the emission of drops by applying a potential difference between conductive liquid ink and the mouth of a nozzle, as in U.S. Pat. No. 1,958,406.

One of the problems which arise with the aforesaid devices and methods known in the art is that the liquid ink encrusts the nozzle and ends by blocking it in the course of time. The choice of special water-based inks does not completely solve the problem of encrustation.

SUMMARY OF THE INVENTION

The object of the present invention is, therefore, to provide a novel solid ink cartridge for use in a non-impact printer for selective emission of solid ink particles free from encrustation problems.

In accordance with the invention, there is provided a solid ink cartridge for use in a non-impact printer including a rod of electrically conductive solid ink formed by a mixture of pigmented particles and a binder, a substantially tubular housing of electrically non conductive material, one rod of said housing being closed by an integral wall having an nozzle to allowing the emission of ink particles, a closure element of electrically conductive material for closing the other end of said housing, said element being electrically connected to said rod, and spring means located inside said housing for urging said rod toward said wall.

Still further objects, features and advantages of the invention will become apparent from the following detailed description of preferred embodiments of the cartridge practicing the novel non-impact printer according to the invention.

DESCRIPTION OF PREFERRED EMBODIMENTS

Figure 1:
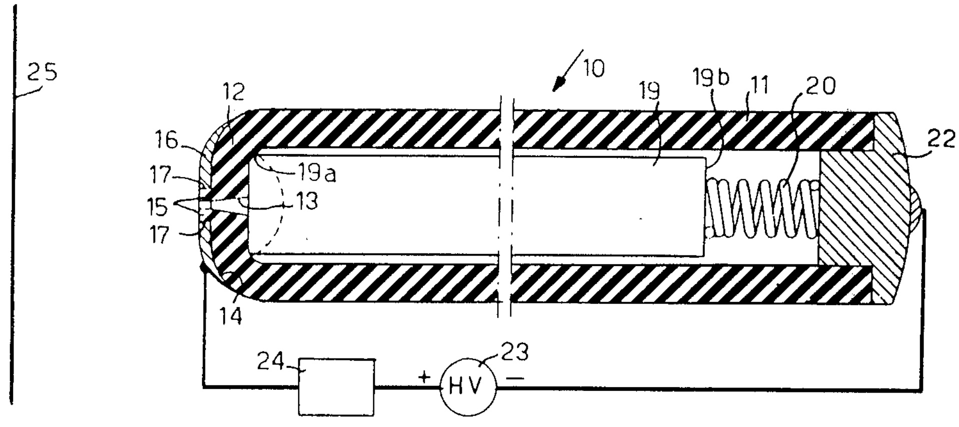
FIG. 1 is a longitudinal section of a first embodiment of a printing device for practicing the invention.

Referring to FIG. 1, a preferred printing device 10 for practicing the invention comprises a hollow cylinder 11 of electrically insulating material, such as glass, ceramic or thermosetting resin. The cylinder 11 is closed at one end by a wall 12 in the center of which there is formed a hole 13, flared toward the inside, with a diameter of the order of 1/10 of a millimeter, so as to assume a substantially frustoconical longitudinal section.

On its outer surface 14, the wall 11 is provided with a circular projection 15 apertured to correspond with hole 13.

A circular electrode 16, having a hole 17 in its center, is mounted on the outer surface 14 and on the circular projection 15 in such a manner that the hole 17 is concentric with the hole 13. The circular electrode 16 may be formed by metallizing the outer wall surface 14.

Inside the hollow cylinder 11 there is mounted a cylindrical rod 19 of electrically conductive ink having a diameter slightly less than the inner diameter of the hollow cylinder 11 and obtained by compressing carbon black (80%–95%) with a binder (5%–20%) which may comprise waxes of various kinds, fatty acids, paraffins, cellulose resins and glycols. One end 19*a* of the rod 19 is pushed against the wall 12 by the action of a spring 20 compressed between the opposite end 19*b* of the rod 19 and a metallic abutment element 22, which can be fixed removably to the hollow cylinder 11, for example inserted therein as a plug, as shown.

The circular electrode 16 is electrically connected to the positive pole of a high voltage generator 23 through a circuit breaker 24; the solid ink 19 is electrically connected to the negative pole of generator 23 via the abutment element 22 and the spring 20.

By applying a potential difference of the order of 4000 V between the two electrodes 16 and 22 by means of closing the circuit breaker 24, erosion of ink particles from the surface 19*a* of the rod occurs and they are emitted through the hole 13 and impinge on a recording sheet 25 located at a distance of 0.5 to 5 mm, forming thereon a sufficiently clear and focussed black dot.

The physical explanation of the phenomenon is not exactly known; it is probably to be looked for in the formation of an electric arc between the surface 19*a* of the ink rod 19 and the electrode 16, with a consequent transport of ink particles toward the electrode 16 and, hence, through hole 13, against the surface of recording sheet 25; a concommitant effect is probably that breakdown of the air dielectric in the conical hole 13 causes a pressure wave inside the hole, as well as in the adjacent area inside the hollow cylinder, such as to "fire" the eroded particles against the recording sheet 25 and keep the hole 13 constantly free of encrustations. The conviction that the predominant cause of the phenomenon is the electric arc is reinforced by the fact that, on inverting the polarities of the foregoing connection (that is, converting the ink rod 19 to the positive pole), the phenomenon does not manifest itself in optimum manner. In fact, for formation of the electric arc, it is necessary that there be heating of the cathode and this does not occur when the cathode is located on the metallic electrode 16 instead of on the solid ink.

Surprisingly, the inversion of polarity causes, on the other hand, a phenomenon of migration of particles deposited on the recording sheet back toward the hole 13, with, at least, partial erasure of a previously printed dot.

Starting with a plane surface 19*a,* the erosion of the rod 19 is not uniform, at least initially, over the entire surface, but is greater in the center and steadily falls off toward the edges and, for obvious reasons of symmetry, after a prolonged number of discharges, the surface 19*a* therefore acquires the form of a spherical cup, as shown in FIG. 1.

For correct functioning of the device, it is necessary that erosion also occur at the places where the curved surface 19*a* bears against the wall 12, so that, as the rod is consumed, the remainder of the rod will slide toward the wall 12 under the influence of spring 20 thereby supplying fresh ink for continuation of the process.

It has been found that with an average hole diameter of between 0.1 mm and 0.3 mm and hole length of between 0.6 mm and 1.5 mm, with a rod 19 having a diameter between 2 mm and 3 mm and with the spring applying a force of from 200 g to 500 g, ink is supplied regularly and the repeatability of the printed dot is ensured.

Figures 5A, 5B, 5C, 5D:
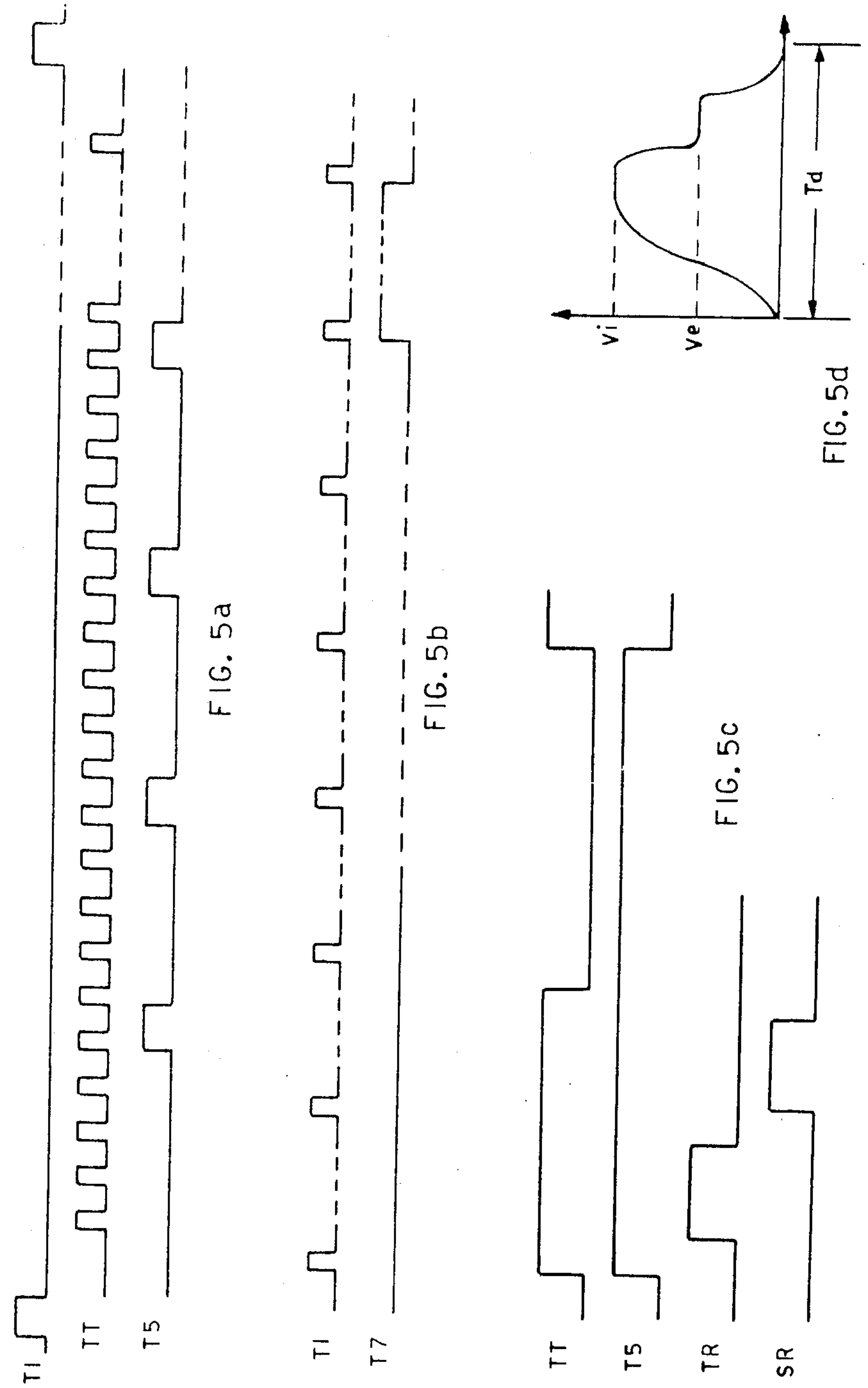
FIGS. 5*a, b, c, d,* are time diagrams of the signals generated by the control unit of FIG. 4.

Optimum results are obtained with the aforesaid dimensions by applying between the electrodes 16 and 22 a pulsed potential difference of the order of 4000 V, with a duration Td between 1 and 200 $\mu$s and with a waveform substantially of the type shown in FIG. 5*d* with $V_i \simeq 4000$ V and $V_e \simeq 2500$–$3000$ V.

With these values, a printing speed of 5000 dots per second has been achieved, with good visibility of the printed dot.

Figure 2:
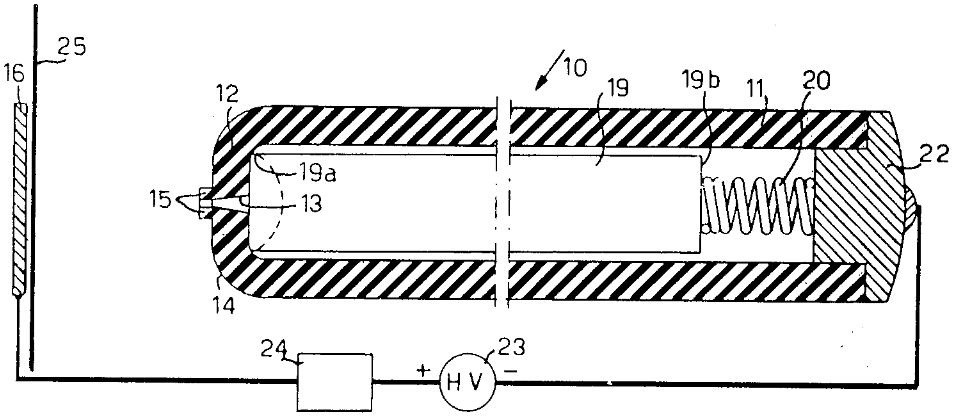
FIG. 2 is a longitudinal section of a second embodiment of the same.

The position and the shape of the electrode 16 have no effect on the operation of the device and, in fact, good results have been obtained with the device of FIG. 2, in which the second electrode 16 is placed behind the recording sheet 25, with the hole to recording sheet distance of the order of 0.5 to 1 mm. On the other hand, in this second embodiment, the phenomenon of erasure of the printed dot is accentuated by inverting the polarity between the two electrodes 16 and 22.

The printing device hereinbefore described constitutes a low-cost printing head 10 which can be employed with advantage in serial, series-parallel and parallel alphanumeric printers for office machines and, moreover, for plotter devices and for facsimile applications.

Figure 3:
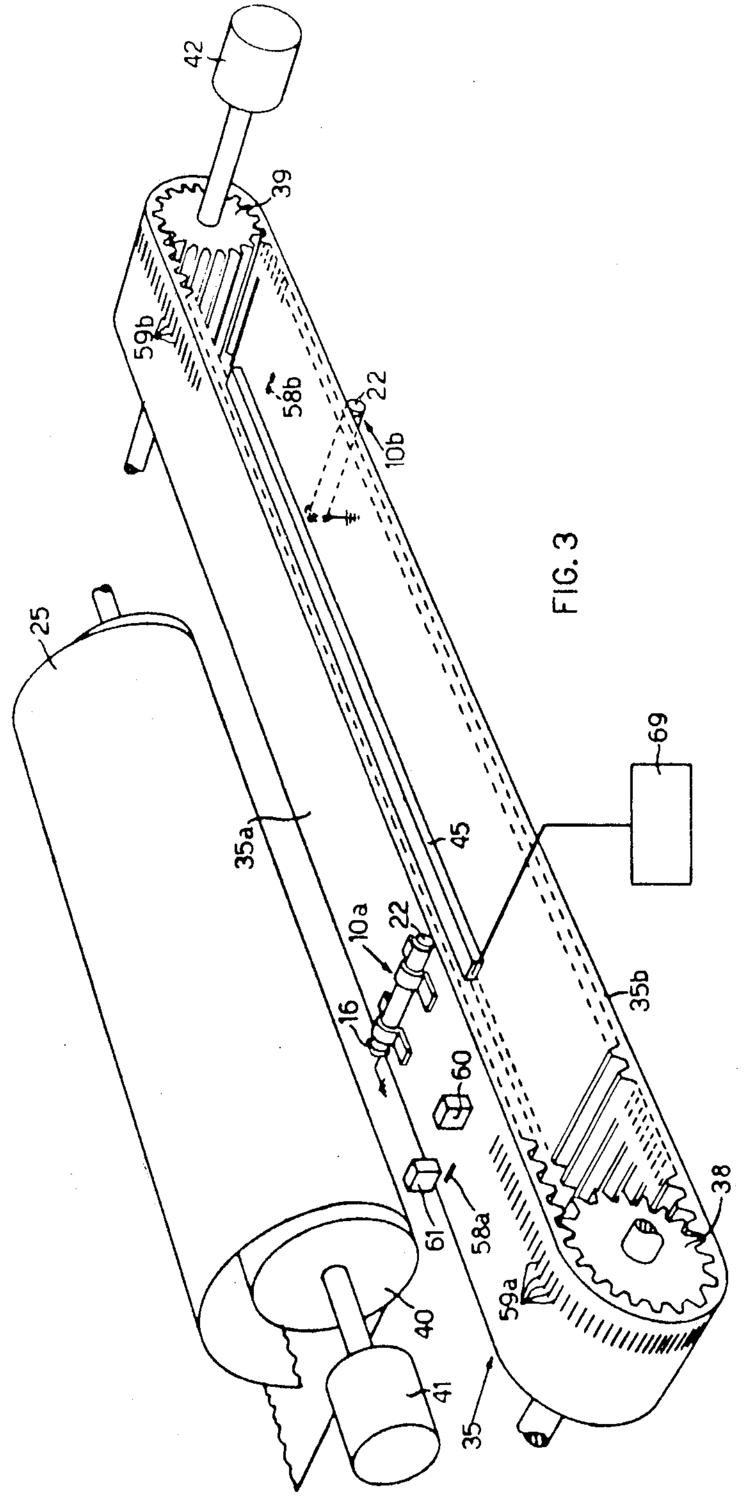
FIG. 3 is a perspective view of a serial printer using a printing device for practicing the invention.

FIG. 3, for example, shows an embodiment of a serial printer using the novel printing device or head for practicing the novel method of the invention.

Two such printing heads 10*a,* 10*b* are mounted on an endless belt 35 which passes around toothed wheels 38 and 39 so that the runs 35*a* and 35*b* of the belt are parallel to the printing line of the recording sheet 25 passed around a platen 40 advanced by elementary line-spacings by means of a stepping motor 41. The endless belt 35 is driven clockwise (FIG. 3) at constant speed by means of a DC motor 42.

Figure 4:
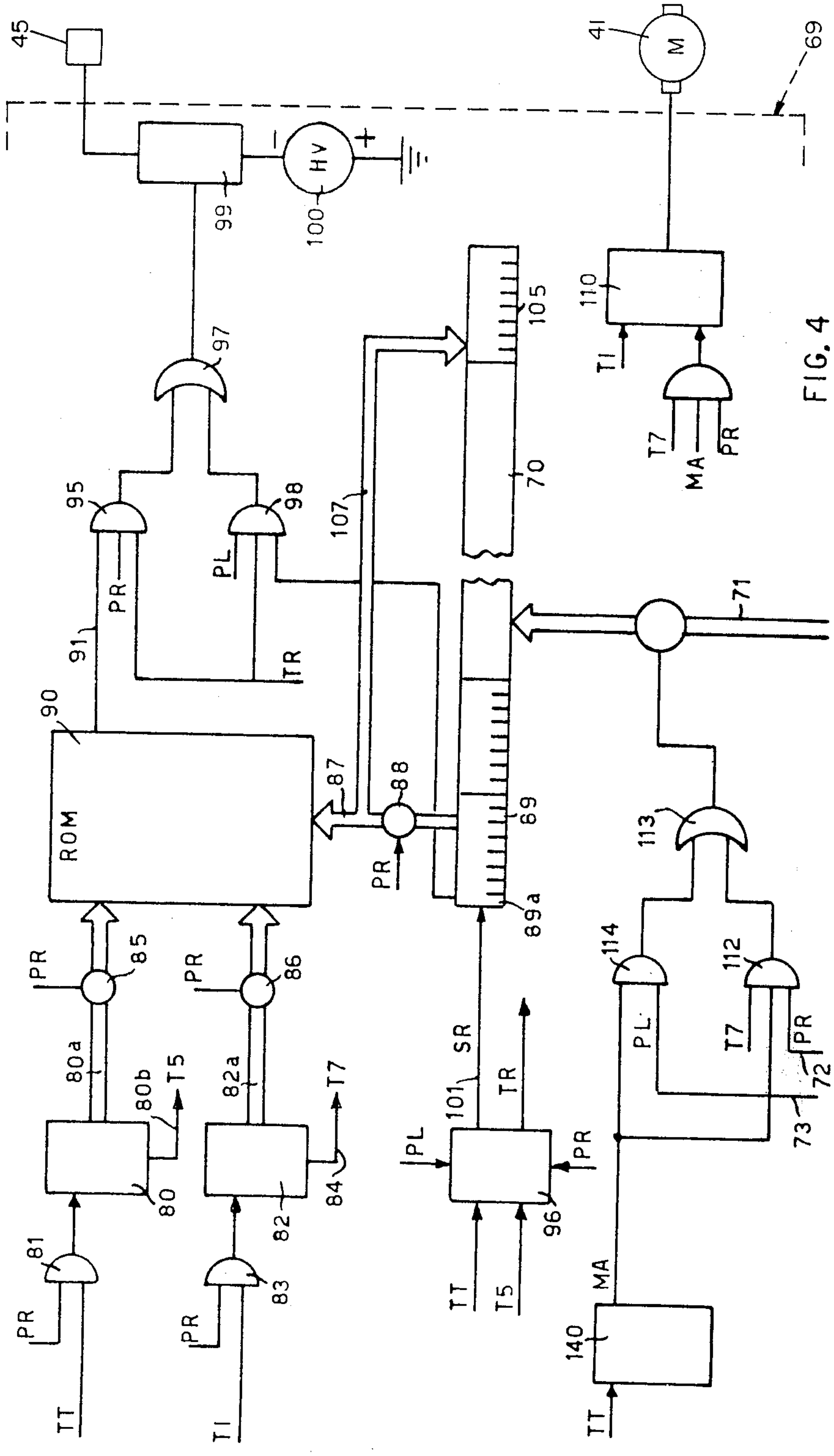
FIG. 4 is a logic diagram of the control unit of the printer of FIG. 3.

The electrode 16 of each of the heads 10*a* and 10*b* is grounded through belt 35. Parallel to and beneath the upper run 35*a* of the belt 35 there is mounted a metal strip 45 connected in a control logic unit 69 (which is shown in its entirety in FIG. 4), via an energizing circuit 99 to the negative pole of a high voltage generator 100, the positive pole of which is grounded.

The heads 10*a* and 10*b* are spaced equally apart on the endless belt 35 so that when one is located at the left-hand end of the run 35*a* the other is located at the right-hand end of the run 35*b.*

Each of the heads 10*a* and 10*b,* transported by the belt 35, moves in upper run 35*a* with its rear electrode 22 a few millimeters distant from the metal strip 45. No metallic connection exists between strip 45 and electrode 22. The high voltage pulses are transmitted by the strip 45 to the electrode 22 through the medium of an electric arc through the air dielectric.

On the belt runs 35*a,* 35*b* there are, moveover, formed pluralities of notches 58*a,* 59*a* and 58*b,* 59*b* adapted to be detected by photocell sensing devices 60 and 61, respectively (FIG. 3.).

The notches 59*a* and 59*b* follow the printing devices 10*a* and 10*b,* respectively, in the direction of movement of the belt 35 and cause the sending of strobe signals TT (FIG. 5*a*) to the control unit 69 (the entire circuit of FIG. 4) through the medium of the sensing device 60, the strobe signals being adapted to define the printing positions for each dot along the printing line.

The first notch 58*a* and 58*b* (FIG. 3) of each run is detected by the photocell device 61, which sends to the control unit a signal TI (FIG. 5*b*) which enables the beginning of the printing of a fresh line of dots and which commands the carrying out of an elementary line-spacing operation of the platen 40 by means of the stepping motor 41.

The control logic unit 69 of the printer (FIG. 4) comprises a shift register 70 within which there is stored the information relating to the line of print which comes from channel 71, for example the output channel of the central unit of a processor to which the printer is understood to be connected.

The signals PR and PL coming from the said processor on wires 72 and 73, respectively, are also applied as input to the control logic unit and, when at logical ONE level, select a plotter (PL) operation mode and a printer (PR) operation mode, respectively, for the control logic unit.

In the first case (PL=1), there is a one-to-one correspondence between the storage cells of the register 70 and the dot printing positions of the printing line.

Each storage cell of the register 70 will therefore have stored therein an information bit at logical ZERO level if a dot does not have to be printed in the corresponding printing position, or a bit at logical ONE level if, on the other hand, a dot must be printed in the corresponding printing position.

In the second case (PR=1), the register 70 is regarded as divided into groups of eight storage cells (bytes), each of which is adapted to store a binary code of an alphanumeric character and each of which corresponds to a printing position of a character within the printing line. Assuming the characters are printed in matrices of seven rows by five columns of dots, there is a character printing position for every five dot printing positions.

The signals TT, coming from the light-sensing device 60, are applied as input count signals to a column counter 80 through an AND circuit 81 enabled by the condition PR=1. The counter 80 counts cyclically from 1 to 5 and, on reaching its maximum counting capacity (5), is adapted to emit a signal T5 on its output 80*b.*

The signals TI coming from the light-sensing device 61 are applied as input count signals to a row counter 82 through an AND circuit 83 enabled by the condition PR=1. The counter 82 counts cyclically from 1 to 7 and, on reaching its maximum counting capacity (7), is adapted to emit a signal T7 on its output 84. The signals TT are moreover applied as input count signals to a counter 140. The counter has a maximum counting capacity equal to the number of storage cells of the register 70 and generates a signal MA at logical ONE level when it reaches its maximum counting capacity.

In the operation of the printer, the counters 80, 82 and 140, therefore, define that dot of the 7×5 matrix of which possible printing is enabled in the printing position identified by the counter 140.

The outputs 80*a* and 82*a* of the counters 80 and 82 are applied as input, through the medium of the AND circuits 85 and 86 enabled by the condition PR=1, to a PROM (read only memory) 90 which also receives as input, through the medium of channel 87 and AND circuit 88, the binary code of the alphanumeric character contained in the byte 89 most to the left of the register 70.

The ROM 90 has stored the printing and non-printing information for each dot of the 7×5 matrix identified by the counters 80 and 82 for each printable alphanumeric character (space included) identified by the byte 89. The ROM 90 supplies the signal at logical ONE level as output on the wire 91 if the identified dot of the matrix is to be printed for formation of the identified character, and at logical ZERO level in the opposite case.

With the condition PR=1, the output 91 enables the AND circuit 95 which, with the timing of a signal TR supplied by a timing unit 96 and via the OR circuit 97, activates the energizing circuit 99 interposed between the negative pole of the high voltage generator 100 and the strip 45, and, by energizing the printing head 10, causes the printing of a dot on the recording sheet. The energizing circuit of the high voltage generator can, moreover, be activated in the plotter operation mode (PL=1) though the medium of the OR circuit 97 and the AND circuit 98, the latter being enabled by the condition PL=1 and by the presence of a bit at logical ONE level in the storage cell 89*a* on the extreme left of the register 70, with the timing of the signal TR.

The timing circuit 96, which is of known type, receives as input the signals TT, T5, PR and PL and is adapted to emit, on the output 101 and as input to the register 70, a signal SR for a shift to the left for each signal TT received if PL=1, and eight consecutive signals SR for a shift to the left for each signal T5 received if PR=1, with a predetermined delay with respect to the signals TT and T5 (FIG. 5). The timing circuit 96 moveover emits as output a signal TR for each input signal TT.

During the printer operation mode, a channel 107 enabled by the condition PR=1 connects the output of the byte 89 of the register 70 with the byte 105 on the extreme right of the register 70.

Therefore, with PR=1, at each advance of the belt 35 by five notches (at each signal T5), the alphanumeric codes stored in the register 70 are translated to the left by one byte by means of eight signals SR and the code of the alphanumeric character adjacent that previously processed for the printing of a dot matrix row is applied as input to the ROM 90 by way of the channel 87.

With PL=1, on the other hand, at each advance by one notch 59, the contents of the storage cells of the register 70 are translated to the left by one cell, so that the information bit adjacent that previously processed for the printing of a dot is stored in the cell 89*a* and that previously processed is lost in the shift. With PR=1, the contents of the register 70 are renewed by the processor, to which the printer is connected, with the rise to ONE of the signal MA following the rise to ONE of the signal T7, with enabling of the channel 71 through the medium of the AND circuit 112 and the OR circuit 113.

With PL=1, on the other hand, the contents of the register 70 are renewed by the processor at each signal MA=1 through the medium of the AND circuit 112 and the OR circuit 114. Each signal TI, moreover, activates the driving circuit 110 of the stepping motor 41 for the execution of a corresponding elementary line-spacing, while with PR=1 the signal MA=1 following the rise of the signal T7 to logical ONE level activates the driving circuit 110 through the AND circuit 120 for the execution of three consecutive line-spacings corresponding to the space between one line of characters and the next. Since the printing commands for the heads 10 are applied to the strip 45, and not directly to the electrode 22 of the head by means of a metallic connection, they are effective only for that head 10 which is running adjacent the strip 45 during the application of a command.

The control unit therefore pays no regard to the presence of one, two or more heads, provided that each head is accompanied by reference notches which allow the position thereof to be detected and the command pulses on the strip 45 to be synchronized with the position.

In addition to permitting control of the head 10, it has been found that the electric discharge which develops between the strip 45 and the rear electrode of the head assists the formation of the electric arc between the ink rod 19 and the electrode 16 and, therefore, also the emission of ink particles for the printing of the dot.

Figure 6:
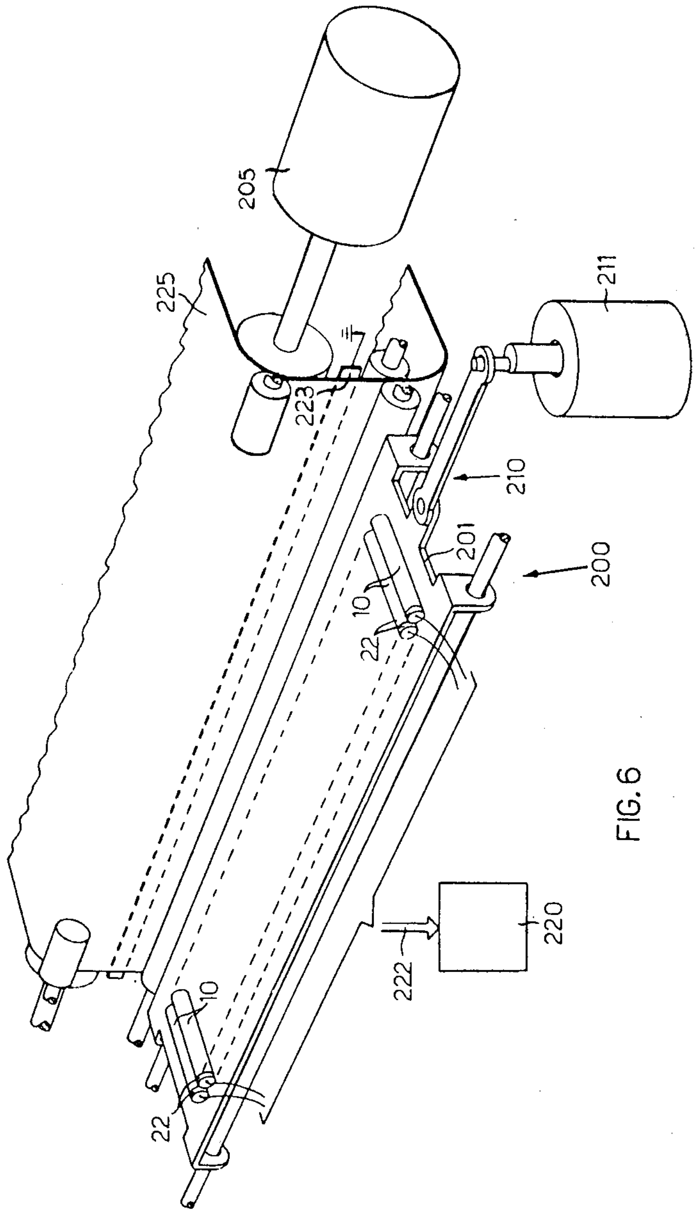
FIG. 6 is a perspective view of a series-parallel printer using a printing device for practicing the invention.

In accordance with another embodiment of the present invention, FIG. 6 shows a series-parallel printer 200 in which a plurality of heads 10 is mounted on a carriage or slide 201 in such a manner that they are aligned and spaced regularly parallel to the printing line of the recording carrier 225 advanced by elementary line-spacings through the medium of the stepping motor 205.

The carriage is made to oscillate parallel to the printing line by means of the eccentric device 210 driven by a DC motor 211. The number of heads 10 mounted on the carriage 201 may be equal to the number of characters which can be written in a line of print and in this case the stroke of the carriage will be at least equal to the width of a character of the line and each head 10 will describe at each oscillation a row of dots of the matrix of an alphanumeric character and, through repeated oscillations, all the matrix dots of a character of the line of print.

Alternatively, the number of heads 10 may be equal to one half of the number of characters which can be written in a line of print and the stroke of the carriage will then have to be at least equal to the width of two characters plus intercharacter spacing and each head will describe all the matrix dots of two adjacent characters of the line of print through repeated oscillations of the carriage.

The printing command is given simultaneously to all the printing heads 10 through the medium of a control unit 220 (FIG. 6) by simultaneously reading from the memory in a known manner the printing information of one line at a time, which, though a cable 222 and the electrodes 22, effect the selective and simultaneous activation of the emission means 19 of all printing devices 10 for a number of times equal to the number of columns in the character matrix during a passage of the carriage 201 produced by the eccentric device 210. In addition, the line spacing means 205 is conditioned to advance the recording sheet 225 during each reversal of movement of the carriage 201, whereby a line of characters is printed during a number of consecutive passages equal to the number of rows in the character matrix.

The front electrodes 16 of the head 10 are replaced in the printer 200 by a single electrode 223 located behind the recording sheet 225 and connected to earth, in accordance with the configuration already described with reference to FIG. 2.

While there has been hereinabove disclosed presently preferred embodiments of apparatus for carrying out the method of the invention it will, nevertheless, be understood that the invention may be practiced using other apparatus and, therefore, it is intended that the scope of the invention be limited only by the proper interpretation to be afforded the appended claims.

We claim:

1. A solid ink cartridge for use in a non-impact printer, including a rod of electrically conductive solid ink formed by a mixture of pigmented particles and a binder, a substantially tubular housing of electrically non conductive material, one end of said housing being closed by an integral wall having a nozzle to allowing the emission of ink particles, a closure element of electrically conductive material for closing the other end of said housing, said element being electrically connected to said rod, and spring means located inside said housing for urging said rod toward said wall.

2. A cartridge according to claim 1, wherein said tubular housing has a hollow cylindrical shape, said rod having a diameter slightly smaller than the inner diameter of said housing.

3. A cartridge according to claim 2, wherein said element is comprised of a closure cap fitting on said other end, said spring means being formed of a compression spring abutting on one end on said cap and on the other end on said rod.

4. A cartridge according to claim 3, wherein said compression spring is made of electrically conductive material.

5. A cartridge according to claim 2, wherein said nozzle is formed of a hole flared toward the inside of said housing and located on the axis thereof.

6. A cartridge according to claim 5, wherein said wall is provided with a circular projection having a hole correspondence with said flared hole with a diameter equal to the smallest diameter of said flared hole.

7. A cartridge according to claim 5, wherein a circular electrode is mounted on the outer surface of said wall, said electrode having a hole in correspondence with said flared hole with a diameter equal to the smallest diameter of said flared hole.

8. A cartridge according to claim 1, wherein said rod is obtained by compressing a mixture of carbon black in the percentage comprised between 80% and 95% with a binder in the percentage comprised between 5% and 20%.

9. A cartridge according to claim 8 wherein said binder is selected from waxes, fatty acids, paraffins, cellulose resins and glycols.

10. A cartridge according to claim 8, wherein the non conductive material of said housing is selected from glass, ceramic, and thermosetting resin.

11. An ink cartridge for use in a non-impact printer comprising:

a block of electrically conductive ink, housing means for said block, said housing means being made of an electrically non conductive material, a wall closing one end of said housing, a nozzle on said wall having a diameter of less than 0.3 mm to allow the emission of ink particles from said housing, an electrode located on the external surface of said housing, and means electrically connecting said block to said electrode.

12. A cartridge according to claim 11, wherein said diameter is comprised in the range between 0.1 and 0.3 mm.

13. A cartridge according to claim 12, wherein said nozzle has a length comprised between 2 and 3 mm.

14. An ink cartridge for use in a non-impact printer comprising:

a rod of electrically conductive solid ink, a substantially tubular housing made of an electrically non conductive material, an end of said housing being closed by an integral wall a nozzle on said wall having a diameter of less than 0.3 mm to allow the emission of ink particles from said housing, an electrode located on the external surface of said housing, and means electrically connecting said rod to said electrode.

15. An ink cartridge for use in a non-impact printer comprising:

a rod of electrically conductive solid ink,

A substantially tubular housing made of an electrically non conductive material, a wall closing one end of said housing, a nozzle on said wall having a diameter of less than 0.3 mm to allow the emission of ink particles from said housing, spring means for urging said rod to abut one of its end surfaces against said wall, thus forming a limited chamber between said end surface and said nozzle, an electrode located on the external surface of said housing, and means electrically connecting said rod to said electrode.

16. An ink cartridge for use in a non-impact printer comprising:

a rod of electrically conductive solid ink, a substantially tubular housing made of an electrically non conductive material, a wall closing one end of said housing, a nozzle on said wall having a diameter of less than 0.3 mm to allow the emission of ink particles from said housing, an electrically conductive element located at the end of said housing opposite to said wall, and means electrically connecting said rod to said element.

17. A cartridge according to claim 16, comprising spring means for urging said rod to abut one of its end surfaces against said wall.

18. An ink cartridge for use in a non-impact printer comprising:

a block of electrically conductive plastic ink formed by a mixture of pigmented particles and a binder, a substantially tubular housing made of an electrically non conductive material, a wall closing one end of said housing, a nozzle on said wall having a diameter of less than 0.3 mm to allow the emission of ink particles from said housing, an electrode located on the external surface of said housing, means electrically connecting said block to said electrode, and a counter electrode mounted on the outer surface of said wall.

19. A cartridge according to claim 18, wherein said counterelectrode is circular and is provided with a hole in register with said nozzle.

20. A cartridge according to claim 19, wherein the nozzle is formed with a hole flared toward the inside of the housing, the hole of said counterelectrode having a diameter substantially equal to the smallest diameter of said flared hole.

21. An ink cartridge for use in a non-impact printer comprising:

a rod of electrically conductive solid ink formed of a mixture of compressed pigmented particles and a binder capable of being eroded by an electric discharge on the surface thereof, a substantially tubular housing made of an electrically non conductive material, a wall closing one end of said housing, a nozzle on said wall, to allow the emission of eroded ink particles from said housing, an electrode located on the external surface of said housing, and means electrically connecting said rod to said electrode.

22. A cartridge according to claim 21, wherein said tubular housing has a hollow cylindrical shape and said wall is integral with said housing, comprising spring means for urging said rod to abut with one of its ends against said wall, thus forming a limited chamber between said end surface and said nozzle.

23. A cartridge according to claim 22, wherein the abutting end of said rod has a substantially spherical concave surface.

* * * * *